US008904794B2

(12) United States Patent
Matsuyama et al.

(10) Patent No.: US 8,904,794 B2
(45) Date of Patent: Dec. 9, 2014

(54) GAS TURBINE HAVING A COMBUSTION OSCILLATION SUPPRESSING DEVICE

(75) Inventors: Keisuke Matsuyama, Hyogo (JP); Kotaro Miyauchi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 976 days.

(21) Appl. No.: 12/671,046

(22) PCT Filed: Oct. 17, 2008

(86) PCT No.: PCT/JP2008/068882
§ 371 (c)(1),
(2), (4) Date: Jan. 28, 2010

(87) PCT Pub. No.: WO2009/051236
PCT Pub. Date: Apr. 23, 2009

(65) Prior Publication Data

US 2010/0186411 A1 Jul. 29, 2010

(30) Foreign Application Priority Data

Oct. 19, 2007 (JP) ................................ 2007-272592

(51) Int. Cl.
*F02C 7/24* (2006.01)
*F01D 9/02* (2006.01)
*F23R 3/00* (2006.01)

(52) U.S. Cl.
CPC . *F02C 7/24* (2013.01); *F01D 9/023* (2013.01); *F23M 99/005* (2013.01); *F23R 3/00* (2013.01); *F05D 2260/963* (2013.01); *F23R 2900/00014* (2013.01); *F05D 2260/96* (2013.01)
USPC ................ 60/725; 60/752; 431/114; 181/213

(58) Field of Classification Search
USPC ........... 60/725, 752, 753, 754, 755, 756, 757, 60/758, 759, 760; 431/114; 181/213, 214, 181/219; 244/1 N
See application file for complete search history.

(56) References Cited

U.S. PATENT DOCUMENTS 3,263,772 A * 8/1966 Irwin et al. .................... 181/227
4,199,936 A * 4/1980 Cowan et al. ................ 60/226.1

(Continued)

FOREIGN PATENT DOCUMENTS

CN 1551965 A 12/2004
JP 2001-254634 A 9/2001

(Continued)

OTHER PUBLICATIONS

Korean Notice of Allowance dated Jul. 30, 2012 issued in corresponding Korean Patent Application No. 10-2010-7002949, (3 pages). With Partial English Translation.

(Continued)

*Primary Examiner* — Gerald L Sung
*Assistant Examiner* — Michael B Mantyla
(74) *Attorney, Agent, or Firm* — Westerman, Hattori, Daniels & Adrian, LLP

(57) ABSTRACT

A gas turbine including a combustion oscillation suppressing device disposed to a transition piece of a combustor to define a gas space S, and having a plurality of vent holes through which a gas space L and the inside of the transition piece communicate. The combustion oscillation suppressing device is formed of a first member and a second member which define the gas space, the second member having the plurality of vent holes, and a portion of a transition piece wall includes the second member. A distance from the second member to the first member in the radial direction of the transition piece is a height of the gas space, and when the height of the gas space varies along an axial direction of the transition piece, an opening ratio σp of each of the plurality of vent holes is adjusted depending on the height of the gas space.

2 Claims, 8 Drawing Sheets

S 341 34
32
$\phi_1$ $\phi_2$ $\phi_3$ ...... $\phi_n$
343 343 343 342
L
FLOW DIRECTION OF COMBUSTION GAS
$\phi_1 > \phi_2 > \phi_3 > \cdots > \phi_n$

(56) References Cited

U.S. PATENT DOCUMENTS

| | | | | |
|---|---|---|---|---|
| 6,530,221 | B1 | 3/2003 | Sattinger | |
| 7,104,065 | B2 * | 9/2006 | Benz et al. | 60/725 |
| 7,856,830 | B2 * | 12/2010 | Alkabie | 60/804 |
| 2002/0088233 | A1 | 7/2002 | Ohnishi et al. | |
| 2004/0248053 | A1 | 12/2004 | Benz et al. | |
| 2005/0103018 | A1 * | 5/2005 | Graf et al. | 60/725 |
| 2005/0166596 | A1 | 8/2005 | Sattinger | |
| 2006/0169532 | A1 | 8/2006 | Patrick | |
| 2006/0169533 | A1 | 8/2006 | Patrick | |

FOREIGN PATENT DOCUMENTS

| | | | |
|---|---|---|---|
| JP | 2004-509313 | A | 3/2004 |
| JP | 2005-527761 | A | 9/2005 |
| JP | 2006-226286 | A | 8/2006 |
| JP | 2006-348932 | A | 12/2006 |
| JP | 2007-132640 | A | 5/2007 |
| JP | 3934048 | B2 | 6/2007 |
| WO | 02/25174 | A1 | 3/2002 |
| WO | 03/023281 | A1 | 3/2003 |

OTHER PUBLICATIONS

International Search Report of PCT/JP2008/068882, mailing date of Nov. 11, 2008.

Chinese Office Action dated Jan. 10, 2011, issued in corresponding Chinese Patent Application No. 200880101143.4.

Extended European Search Report dated May 22, 2014, issued in corresponding European Patent Application No. 08838623.0 (12 pages).

* cited by examiner

VIEWED FROM A-A

VIEWED FROM B-B

GAS TURBINE HAVING A COMBUSTION OSCILLATION SUPPRESSING DEVICE

TECHNICAL FIELD

The present invention relates to a gas turbine, and, more particularly, to a gas turbine that improves appearance of a combustion oscillation suppressing device disposed on a transition piece of a combustor.

BACKGROUND ART

Gas turbines manufactured in recent years have a combustion oscillation suppressing device (acoustic liner) on a transition piece of a combustor to suppress combustion oscillation generated in the combustor. A technique described in Patent Document 1 is known as a conventional gas turbine in which the above-described structure is adopted. A combustion oscillation suppressing device (modular resonator) of the conventional gas turbine is a modular resonator used in a combustion turbine power plant in which a compressor, a combustor assembly, a transition section, and a turbine assembly define a flow path. The modular resonator has a first member that has a size substantially smaller than the diameter of the flow path, and a plurality of openings therethrough; and a second member maintained spaced apart from the first member, and defining a gas space between the first member and the second member. The first member has the openings in fluid communication with the flow path.

Patent Document 1: Published Japanese Translation of PCT Application No. 2004-509313

DISCLOSURE OF INVENTION

Problem to be Solved by the Invention

In a combustion oscillator of the conventional gas turbine, the first member defining the gas space is provided parallel to a sidewall of a transition piece (housing). Therefore, if the transition piece has a tapered shape, wrinkles are apt to be produced on a bent portion of the pressed first member. As a result, acoustic and structural performances of products may be degraded.

In view of the foregoing, the present invention has an object to provide a gas turbine that improves appearance of a combustion oscillation suppressing device disposed on a transition piece of a combustor.

Means for Solving Problem

According to an aspect of the present invention, a gas turbine includes a combustion oscillation suppressing device being disposed to a transition piece of the combustor to define a gas space, and communicating the gas space and an inside of the transition piece through a plurality of vent holes, in order to reduce combustion oscillation generated in a combustor. The combustion oscillation suppressing device includes: a first member that has a substantially U-shaped cross-section formed by press-working, and is disposed on an outer circumference of the transition piece with a substantially U-shaped cross-section opening thereof facing the transition piece; and a second member that defines the gas space between the first member and the second member by covering the substantially U-shaped cross-section opening of the first member, and has the vent holes, and in a radial-direction cross section of the transition piece, when an outer diameter of the transition piece varies along an axial direction of the transition piece, distances d1 and d2 from an axis L of the transition piece to each bent portion of the first member having the substantially U-shaped cross-section are set to be substantially equal.

In the gas turbine according to the present invention, the distances d1 and d2 from the axis L of the transition piece to each bent portion of the first member having a substantially U-shaped cross-section are set to be substantially equal. Therefore, the bottom of the substantially U-shaped cross-section of the first member is disposed substantially parallel to the axis L of the transition piece. Such a structure has an advantage that the first member can be easily pressed when formed to have a substantially U-shaped cross-section.

According to another aspect of the present invention, a gas turbine includes a combustion oscillation suppressing device being disposed to a transition piece of the combustor to define a gas space, and communicating the gas space and an inside of the transition piece through a plurality of vent holes, in order to reduce combustion oscillation generated in a combustor. The combustion oscillation suppressing device is formed of a first member and a second member both of which define the gas space, the second member having the vent holes, and in a radial-direction cross section of the transition piece, a distance from the second member to the first member in the radial direction of the transition piece is referred to as a height h of the gas space, and when the height h of the gas space varies along an axial direction of the transition piece, an opening ratio σp of the vent holes is adjusted depending on the height h of the gas space.

In the gas turbine, the acoustic absorption characteristics of the device can be varied by adjusting the opening ratio σp of the vent holes depending on the height h of the gas space. Accordingly, appropriate acoustic absorption characteristics of the device can be advantageously obtained.

Advantageously, in the gas turbine, when the height h of the gas space decreases along the axial direction of the transition piece, the opening ratio σp of the vent holes decreases.

In the gas turbine, the height h of the gas space decreases along the axial direction of the transition piece, whereby a frequency of which an acoustic absorption coefficient has a peak value is shifted to a high frequency side. On the other hand, a frequency of which an acoustic absorption coefficient has a peak value is shifted to a low frequency side by reducing the opening ratio σp of the vent holes. These synergistic effects have an advantage that uniform acoustic absorption characteristics of the combustion oscillation suppressing device can be obtained with respect to the axial direction of the transition piece even when the height h of the gas space is not uniform.

Advantageously, in the gas turbine, when the height h of the gas space decreases along the axial direction of the transition piece, the opening ratio σp of the vent holes increases.

In the gas turbine, the height h of the gas space decreases along the axial direction of the transition piece, whereby a frequency of which an acoustic absorption coefficient has a peak value is shifted to a high frequency side. Moreover, a frequency of which an acoustic absorption coefficient has a peak value is shifted to a low frequency side by increasing the opening ratio σp of the vent holes. By effectively using these synergistic effects, appropriate acoustic absorption characteristics required for the gas turbine can be advantageously obtained.

Advantageously, in the gas turbine, the opening ratio σp of the vent holes is adjusted by varying diameters of the vent holes along the axial direction of the transition piece.

The gas turbine has an advantage that, because the opening ratio σp of the vent holes can be adjusted while maintaining spacing intervals of the vent holes, strength of the second member can be appropriately maintained compared with that in a structure with vent holes having non-uniform spacing intervals, for example.

Advantageously, in the gas turbine, the opening ratio σp of the vent holes is adjusted by varying spacing intervals of the vent holes along the axial direction of the transition piece.

The gas turbine has an advantage that, because the opening ratio σp of the vent holes can be adjusted while a diameter ϕ of the vent holes is maintained constant, the vent holes can be easily worked compared with that in a structure with vent holes having a non-uniform diameter.

Advantageously, in the gas turbine, a sound tube used for adjusting acoustic absorption characteristics of a specific frequency band is disposed to the first member.

The gas turbine has an advantage that, because the sound tube is used to adjust the acoustic absorption characteristics in a specific frequency band, appropriate acoustic absorption characteristics of the device can be obtained more efficiently. Disposing the sound tube to the device provides a wide frequency response, for example.

Effect of the Invention

In the gas turbine according to the present invention, the distances d1 and d2 from the axis L of the transition piece to each bent portion of the first member having a substantially U-shaped cross-section are set to be substantially equal. Therefore, the bottom of the substantially U-shaped cross-section of the first member is disposed substantially parallel to the axis L of the transition piece. Such a structure has an advantage that the first member can be easily pressed when formed to have a substantially U-shaped cross-section.

In the gas turbine, the acoustic absorption characteristics of the device can be varied by adjusting the opening ratio σp of the vent holes depending on the height h of the gas space. Accordingly, appropriate acoustic absorption characteristics of the device can be advantageously obtained.

EXPLANATIONS OF LETTERS OR NUMERALS

Figure 1:
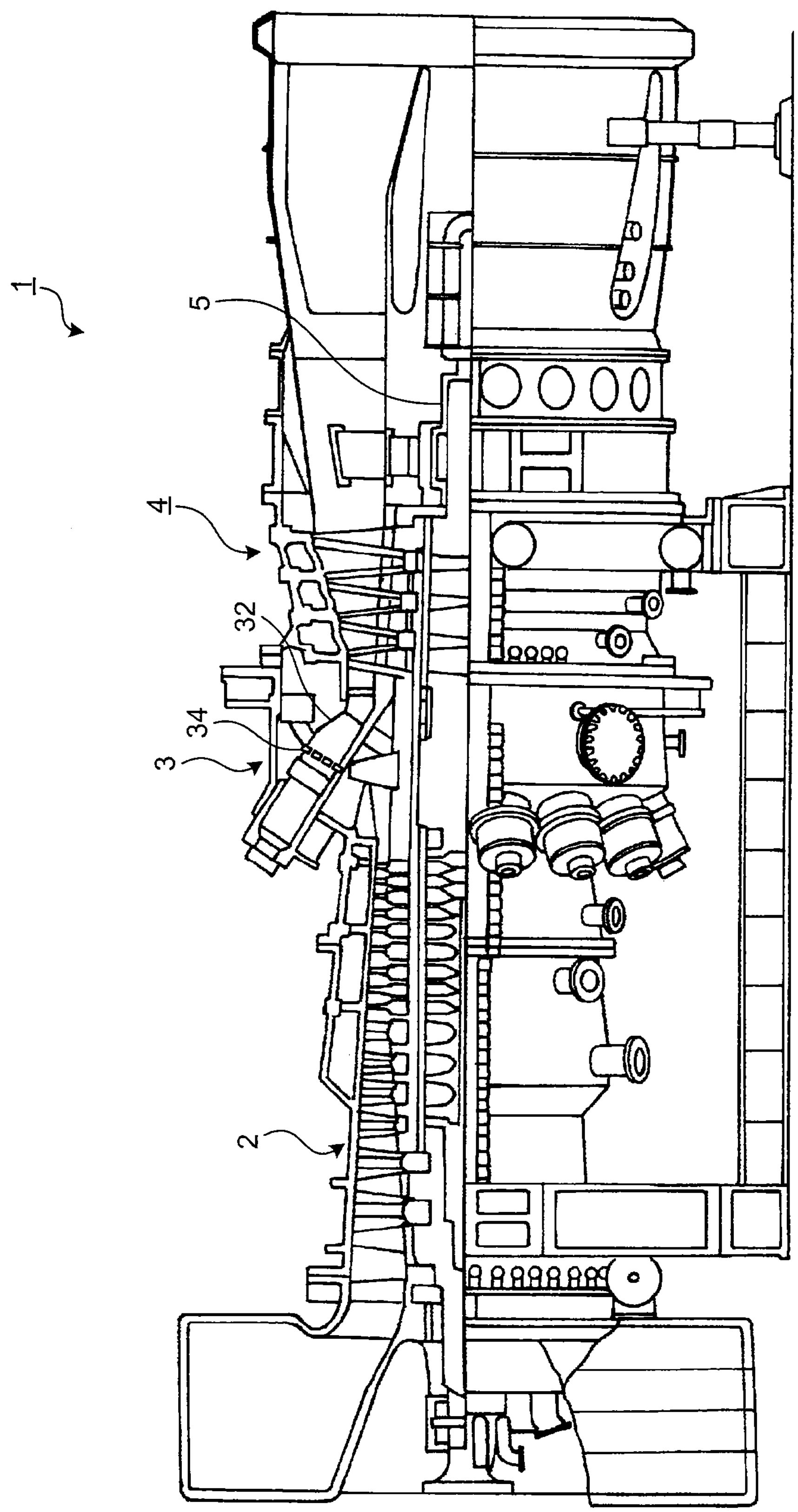
FIG. 1 is a schematic of an entire structure of a gas turbine according to an embodiment of the invention.

1 gas turbine
2 compressor
3 combustor
4 turbine
5 rotor
21 casing
31 inner tube
32 transition piece
33 fuel nozzle
34 combustion oscillation suppressing device
341 first member
342 second member
343 vent hole
344 sound tube
345 adjusting member

BEST MODE(S) FOR CARRYING OUT THE INVENTION

The present invention is described in detail below with reference to the accompanying drawings. The present invention is not, however, limited thereto. Moreover, the structural elements in the embodiments include an element that can be easily substituted by those skilled in the art, or a substantial equivalent. Multiple modifications described in the embodiment below can be arbitrarily combined with one another within the scope apparent to those skilled in the art.

Embodiment

Figure 2:
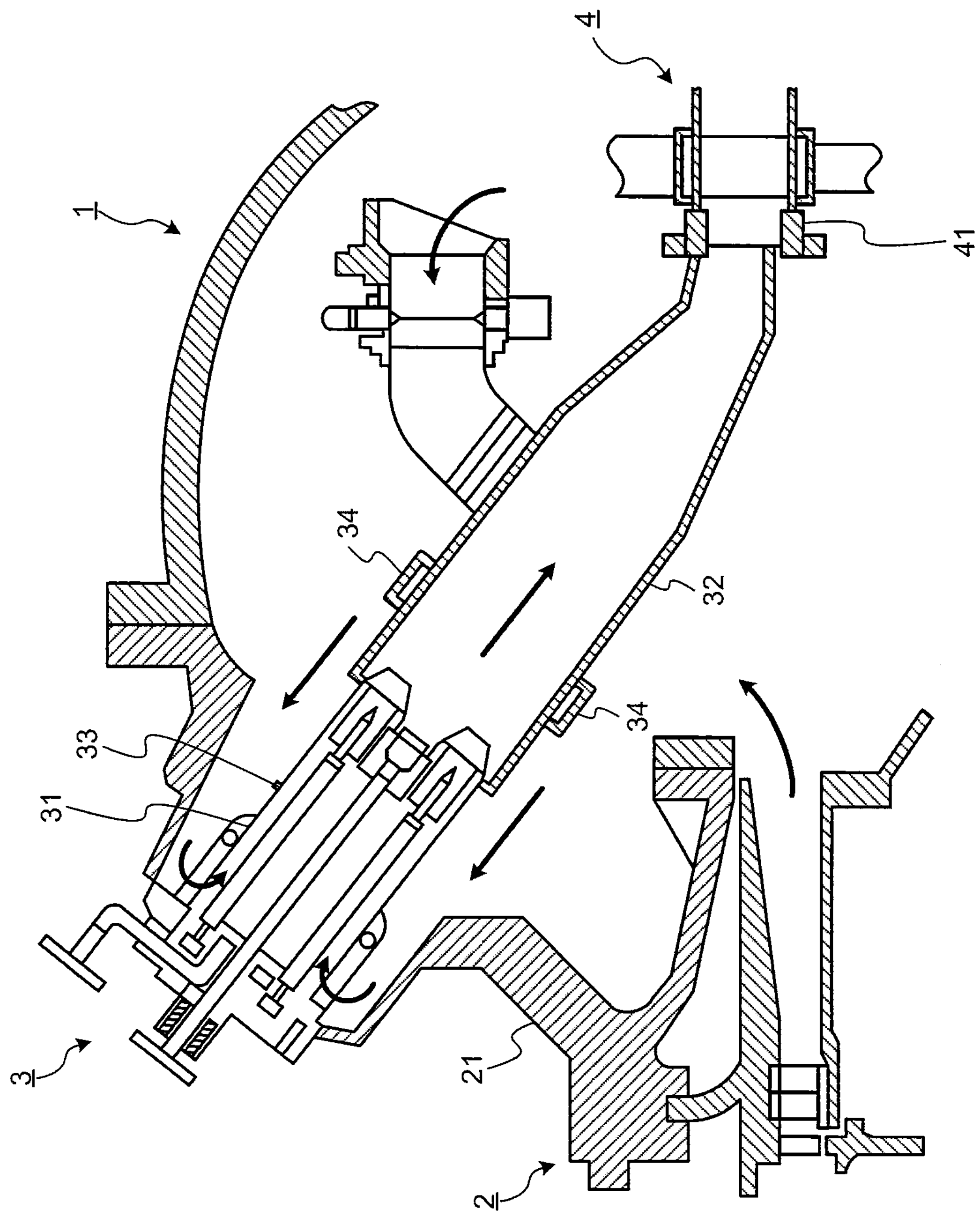
FIG. 2 is a sectional view illustrating a combustor of the gas turbine depicted in FIG. 1.
Figure 3:
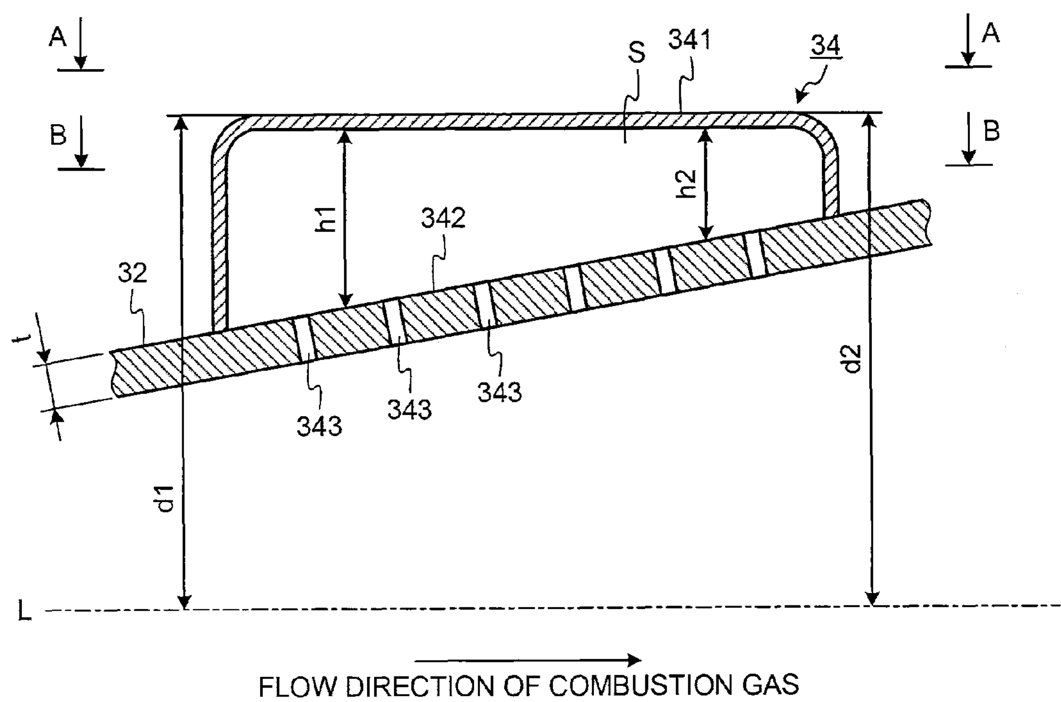
FIG. 3 is a structural view of a combustion oscillation suppressing device of the combustor depicted in FIG. 2.
Figure 4:
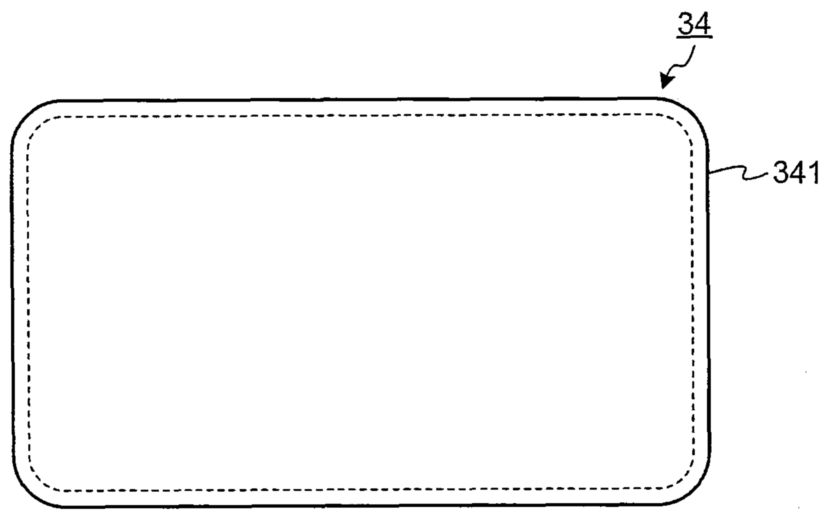
FIG. 4 is a schematic viewed in the A-A direction, illustrating the oscillation suppressing device depicted in FIG. 3.
Figure 5:
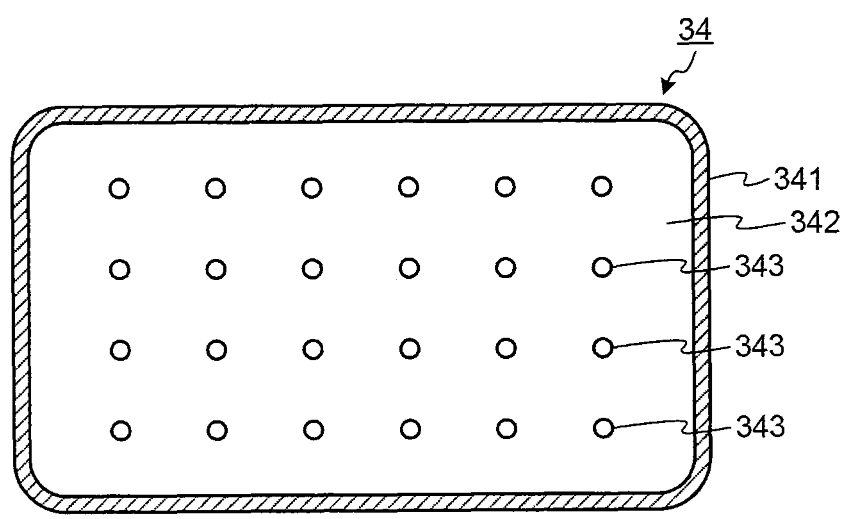
FIG. 5 is a schematic viewed in the B-B direction, illustrating the oscillation suppressing device depicted in FIG. 3.

FIG. 1 is a schematic of an entire structure of a gas turbine according to an embodiment of the invention. FIG. 2 is a sectional view illustrating a combustor of the gas turbine depicted in FIG. 1. FIG. 3 is a structural view of a combustion oscillation suppressing device of the combustor depicted in FIG. 2. FIGS. 4 and 5 are schematics viewed in the A-A direction (FIG. 4), and in the B-B direction (FIG. 5), illustrating the oscillation suppressing device depicted in FIG. 3. FIGS. 6 to 11 are explanatory views illustrating modifications of the combustion oscillation suppressing device depicted in FIG. 3.

Gas Turbine

This gas turbine 1 has a compressor 2, a combustor 3, and a turbine 4 (see FIG. 1). The compressor 2 compresses air taken in from an air intake to produce compressed air. The combustor 3 injects fuel to the compressed air to produce combustion gas at high temperature and high pressure. The turbine 4 transmits the thermal energy of the combustion gas to rotation energy of a rotor 5 to generate a drive power. The drive power is transmitted to a generator (illustration omitted) and the like, connected to the rotor 5.

The combustor 3 is disposed to the posterior direction of an exit of the compressor 2 and the front of the turbine 4. Multiple combustors 3 are annularly arranged in the circumferential direction of the turbine 4. The combustors 3 each have an inner tube 31, a transition piece (combustion cylinder) 32, and a fuel nozzle 33. The inner tube 31 is a tubular member that serves as a combustion chamber in the combustor 3, and fixedly attached to a casing 21 of the compressor 2. The transition piece 32 is a tubular member that connects the inner tube 31 and an inlet 41 of the turbine 4. The fuel nozzle 33 is a nozzle used for injecting fuel to the combustion chamber, and inserted in the inner tube 31 to be arranged.

In the gas turbine 1, air compressed in the compressor 2 (compressed air) is supplied into the combustor 3 through the inner tube 31 and the transition piece 32 of the combustor 3. In the combustion chamber of the combustor 3, air fuel mixture in which the compressed air and the fuel injected from the fuel nozzle 33 are mixed is burnt to produce combustion gas at high temperature and high pressure. The combustion gas is supplied to the turbine 4 via the transition piece 32.

Combustion Oscillation Suppressing Device

In the gas turbine 1, the combustor 3 has a combustion oscillation suppressing device (acoustic liner) 34 (see FIG. 2). The combustion oscillation suppressing device 34 is disposed to the transition piece 32 of the combustor 3 to define a gas space S, and has a plurality of vent holes 343 through which the gas space S and the inside of the transition piece 32 communicate with each other. In the combustion oscillation suppressing device 34, gas is delivered between the gas space S and the inside of the transition piece 32 to suppress the combustion oscillation in the combustor 3. The combustion oscillation herein means, for example, acoustic energy generated due to variation of burning velocity, which is generated or amplified in the transition piece 32 of the combustor 3. In the embodiment, the combustion oscillation suppressing device 34 is disposed on the outer circumference of the transition piece 32. Multiple combustion oscillation suppressing devices 34 are arranged over the whole circumstance of the transition piece 32 while being spaced at a predetermined interval.

The combustion oscillation suppressing device 34 includes a first member 341 and a second member 342, and disposed to the transition piece 32 of the combustor 3 (see FIGS. 3 to 5). The first member 341 is a member (liner box) that defines the gas space (rear layer) S on the outer circumference of the transition piece 32. The first member 341 has a substantially U-shaped cross-section formed by pressing a plate member, and is disposed on the outer circumference of the transition piece 32 with a substantially U-shaped cross-section opening thereof facing the transition piece 32 side. The second member 342 defines the gas space S between the first member 341 and the second member 342 by covering the substantially U-shaped cross-section opening of the first member 341. The second member 342 has the vent holes 343 through which the gas space S and the inside of the transition piece 32 (path of the combustion gas) communicate with each other.

In the embodiment, for example, the first member 341 is box-shaped formed by pressing a metal plate member (see FIGS. 3 to 5). Specifically, the first member 341 is box-shaped, which has a substantial quadrangle shape in a plan view, and also has a substantially U-shaped cross-section. The first member 341 also has bent portions having an R-section formed by press-working. The first member 341 is disposed to the outer circumference of the transition piece 32 with the substantially U-shaped cross-section opening facing the transition piece 32 side (second member 342). The second member 342 and the transition piece 32 are integrally formed. The first member 341 is secured to the second member 342 (wall surface of the transition piece 32) by welding. The second member (wall surface of the transition piece 32) 342 has the vent holes 343 through which the gas space S and the inside of the transition piece 32 communicate with each other.

In the combustion oscillation suppressing device 34, the outer diameter of the transition piece 32, when seen in a radial-direction cross section of the transition piece 32, varies along the axial direction of the transition piece 32 (a direction of the axis L, a flow direction of the combustion gas) (see FIG. 3). In the embodiment, the outer diameter of the transition piece 32 gradually increases toward the axial direction of the transition piece 32 (tapered shape), for example. A distance d from the axis L of the transition piece 32 to an inner wall surface of the first member 341 (wall surface defining the gas space S) is set to be substantially equal (d1=d2). That is, the inner wall surface of the first member 341 is disposed substantially parallel to the axis L of the transition piece 32. On the other hand, a height h (a distance in the radial direction of the transition piece 32, from the wall surface of the second member 342 to the wall surface of the first member 341) of the gas space S varies along the axial direction of the transition piece 32. In the embodiment, for example, the height h of the gas space S is gradually reduced along the axial direction of the transition piece 32 (h1>h2).

[Effects]

In the gas turbine 1, the distances d1 and d2 from the axis L of the transition piece 32 to each bent portion of the first member 341 having a substantially U-shaped cross-section are set to be substantially equal. Therefore, the bottom of the substantially U-shaped cross-section of the first member 341 is disposed substantially parallel to the axis L of the transition piece 32 (see FIG. 3). Such a structure has an advantage that the first member 341 can be easily pressed, when being formed to have a substantially U-shaped cross-section. Advantageously, the easy press-working of the first member 341 results in reduction of the production cost. When the transition piece has a tapered shape, for example, in the structure in which the inner wall surface of the first member is disposed parallel to the outer wall surface of the transition piece (illustration omitted), wrinkles are apt to be produced on one of the bent portions of the first member (having a smaller diameter of the transition piece) at the time of pressing the first member 341. As a result, appearance of productions may be degraded.

Acoustic Absorption Characteristics of Combustion Oscillation Suppressing Device Generally, acoustic absorption characteristics (a relationship between a frequency of the combustion oscillation and acoustic absorption coefficient) of the combustion oscillation suppressing device 34 vary depending on variation of the height h of the gas space S or an opening ratio $\sigma p$ of the vent holes. For example, a frequency band where an acoustic absorption coefficient has a peak value varies depending on variation of the opening ratio $\sigma p$ of the vent holes and the height h of the gas space S.

Figure 6:
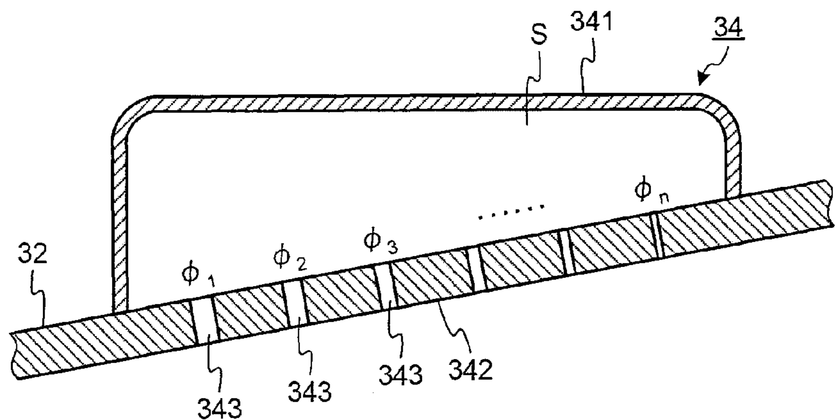
FIG. 6 is an explanatory view illustrating a modification of the combustion oscillation suppressing device depicted in FIG. 3.
Figure 7:
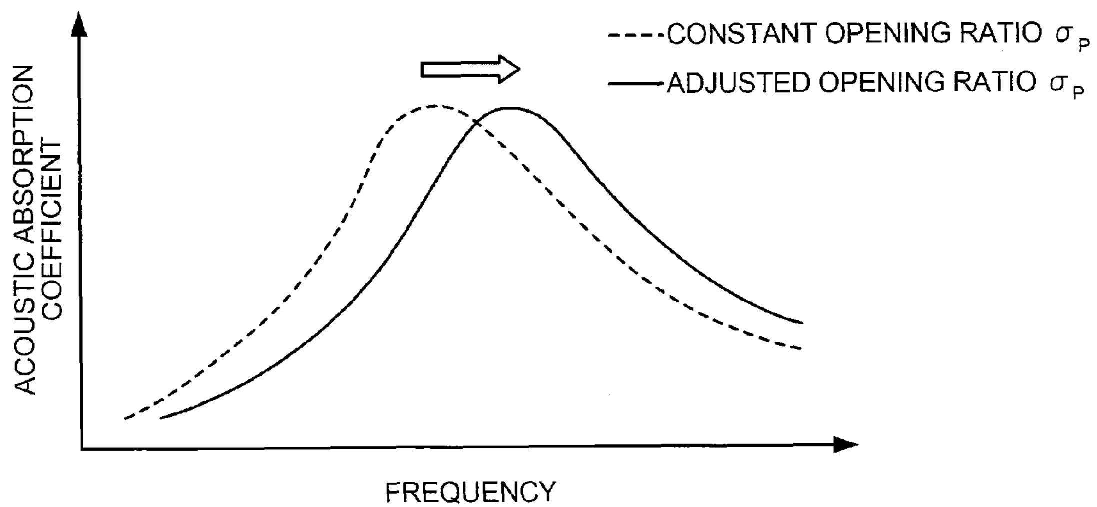
FIG. 7 is an explanatory view illustrating the modification of the combustion oscillation suppressing device depicted in FIG. 3.

Therefore, in the gas turbine 1, it is preferable that, when the height h of the gas space S varies along the axial direction of the transition piece 32, in the radial-direction cross section of the transition piece 32, the opening ratio $\sigma p$ of the vent holes 343 be adjusted depending on the height h of the gas space S (see FIG. 6). In such a structure, the acoustic absorption characteristics of the device can be varied by adjusting the opening ratio $\sigma p$ of the vent holes 343 depending on the height h of the gas space S (see FIG. 7). For example, a frequency band where an acoustic absorption coefficient has a peak value can be shifted or distributed by adjusting the opening ratio $\sigma p$ of the vent holes 343. Accordingly, appropriate acoustic absorption characteristics of the device can be advantageously obtained. The opening ratio $\sigma p$ of the vent holes 343 herein means an area of the vent holes 343 per unit area of the second member 342.

In the structure, it is preferable that, when the height h of the gas space S decreases along the axial direction of the transition piece 32, the opening ratio $\sigma p$ of the vent holes 343 be reduced (see FIG. 6). In such a structure, the height h of the gas space S decreases along the axial direction of the transition piece 32, whereby a frequency of which an acoustic absorption coefficient has a peak value is shifted to a high frequency side. On the other hand, a frequency of which an acoustic absorption coefficient has a peak value is shifted to a low frequency side by reducing the opening ratio σp of the vent holes 343 (see FIG. 7). By effectively using these synergistic effects, appropriate acoustic absorption characteristics required for the gas turbine can be advantageously obtained. For example, even when the height h of the gas space S is not uniform, uniform acoustic absorption characteristics of the combustion oscillation suppressing device 34 can be advantageously obtained with respect to the axial direction of the transition piece.

Alternatively, in the structure, when the height h of the gas space S decreases along the axial direction of the transition piece 32, the opening ratio σp of the vent holes 343 may increase (see FIG. 8), for example. In such a structure, the height h of the gas space S decreases along the axial direction of the transition piece 32, whereby a frequency of which an acoustic absorption coefficient has a peak value is shifted to a high frequency side. In addition, the opening ratio σp of the vent holes 343 increases, whereby a frequency of which an acoustic absorption coefficient has a peak value is shifted to a high frequency side. By effectively using these synergistic effects, appropriate acoustic absorption characteristics required for the gas turbine can be advantageously obtained.

Alternatively, in the structure, it is preferable that the opening ratio σp of the vent holes 343 be adjusted by varying diameters ϕ of the vent holes 343 along the axial direction of the transition piece 32 (see FIG. 6). The structure has an advantage that, because the opening ratio σp of the vent holes 343 can be adjusted while spacing intervals of the vent holes 343 are maintained constant, strength of the second member 342 can be appropriately maintained compared with that in the structure with vent holes having non-uniform spacing intervals, for example.

In the embodiment illustrated in FIG. 6, for example, the height h of the gas space S decreases along the axial direction of the transition piece 32, and also diameters ϕ1, ϕ2, . . . , ϕn of the vent holes 343 are reduced along the axial direction of the transition piece 32 (ϕ1>ϕ2> . . . >ϕn). That is, the opening ratio σp of the vent holes 343 is adjusted in a manner that the smaller the height h of the gas space S is, the smaller the opening ratio σp of the vent holes 343 is.

Figure 8:
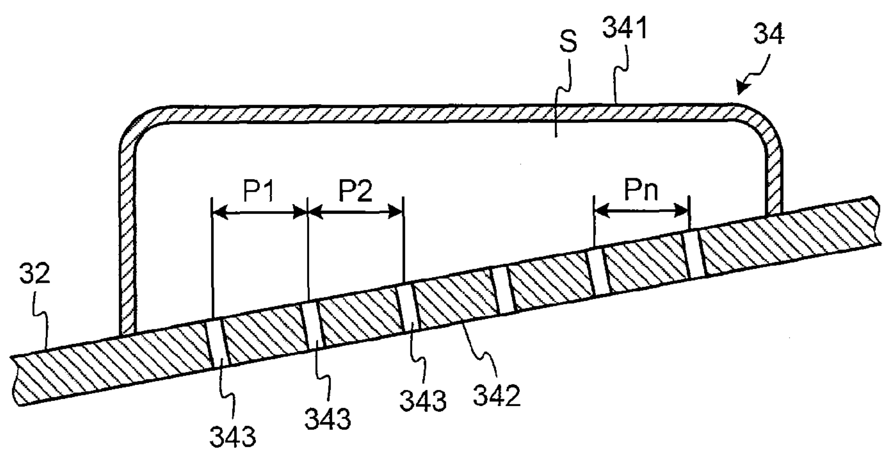
FIG. 8 is an explanatory view illustrating a modification of the combustion oscillation suppressing device depicted in FIG. 3.

Alternatively, in the structure, it is preferable that the opening ratio σp of the vent holes 343 be adjusted by varying spacing intervals P of the vent holes 343 along the axial direction of the transition piece 32 (see FIG. 8). The structure has an advantage that, because the opening ratio σp of the vent holes 343 can be adjusted while a diameter ϕ of the vent holes 343 can be maintained constant, the vent holes 343 can be easily worked compared with that in a structure with vent holes having a non-uniform diameter.

Figure 9:
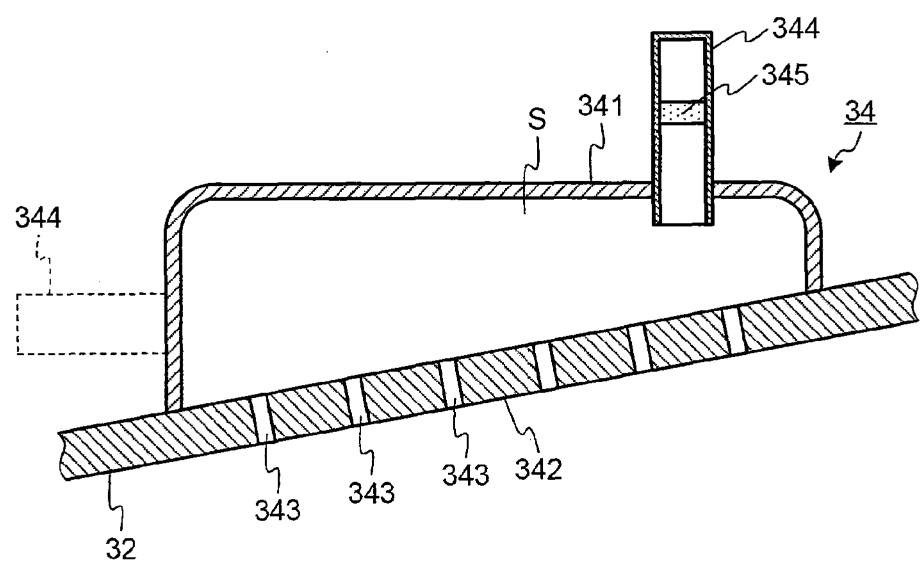
FIG. 9 an explanatory view illustrating a modification of the combustion oscillation suppressing device depicted in FIG. 3.
Figure 10:
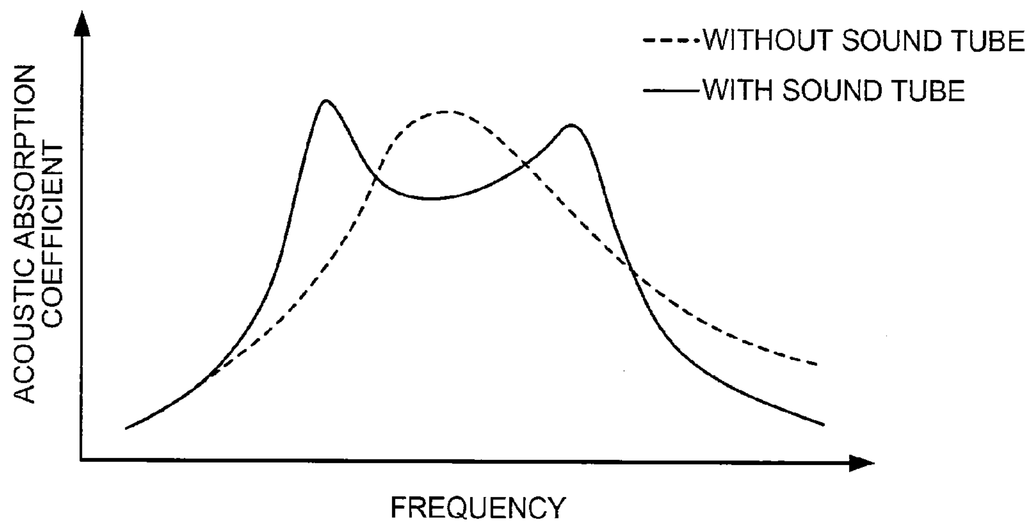
FIG. 10 is an explanatory view illustrating the modification of the combustion oscillation suppressing device depicted in FIG. 3.

In the embodiment illustrated in FIG. 9, for example, the height h of the gas space S decreases along the axial direction of the transition piece 32, and also spacing intervals P1, P2, . . . Pn of the vent holes 343 are reduced along the axial direction of the transition piece 32 (P1>P2> . . . >Pn). That is, the opening ratio σp of the vent holes 343 is adjusted in a manner that the smaller the height h of the gas space S is, the larger the opening ratio σp of the vent holes 343 is.

Sound Tube

In the gas turbine 1, it is preferable that a sound tube 344 used for adjusting the acoustic absorption characteristics of a specific frequency band be disposed to the first member 341 (see FIG. 9). The structure has an advantage that, because the sound tube 344 is used to adjust the acoustic absorption characteristics in a specific frequency band, appropriate acoustic absorption characteristics of the device can be obtained more efficiently. Disposing the sound tube 344 to the device provides a wide frequency response (see FIG. 10), for example.

In the embodiment, the sound tube 344 formed of a single piece of metal is disposed to the first member 341 (see FIG. 9). The sound tube 344 includes an adjusting member (resistance) 345 formed of a porous metal and the like. A frequency band to be adjusted can be changed by changing a position of the adjusting member 345 (see FIG. 10). Alternatively, a frequency band to be adjusted can be changed by varying the whole length of the sound tube 344. The sound tube 344 may be disposed to any position of the first member 341 (a position denoted by a dashed line in FIG. 9, for example).

Thickness of First Member

Figure 11:
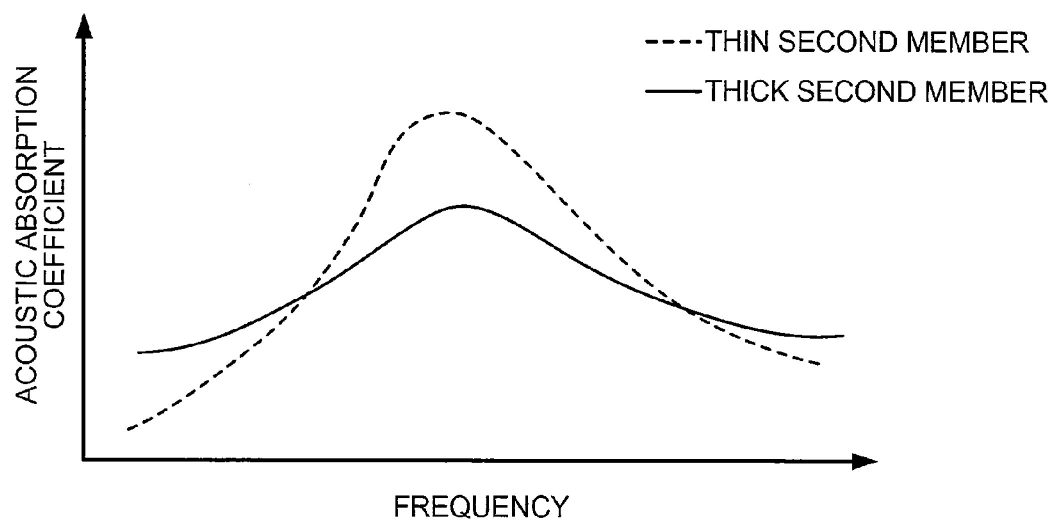
FIG. 11 is an explanatory view illustrating a modification of the combustion oscillation suppressing device depicted in FIG. 3.

Alternatively, acoustic characteristics of the device may be adjusted by a thickness t of the first member 341 (see FIGS. 3 and 11). For example, a smaller thickness t of the first member 344 results in a wider range of acoustic characteristics of the device.

INDUSTRIAL APPLICABILITY

As described above, the gas turbine according to the present invention is useful in that appearance of the combustion oscillation suppressing device disposed on the transition piece of the combustor can be improved.

The invention claimed is:

1. A gas turbine comprising a combustion oscillation suppressing device being disposed to a transition piece of the combustor to define a gas space, and communicating the gas space and an inside of the transition piece through a plurality of vent holes, in order to reduce combustion oscillation generated in a combustor, wherein the combustion oscillation suppressing device is formed of a first member and a second member both of which define the gas space, the second member having the plurality of vent holes, wherein a portion of a transition piece wall comprises the second member, in a radial-direction cross section of the transition piece, a distance from the second member to the first member in the radial direction of the transition piece is referred to as a height h of the gas space, and when the height h of the gas space varies along an axial direction of the transition piece, an opening ratio σp of each of the plurality of vent holes is adjusted depending on the height h of the gas space, wherein as the height h of the gas space decreases, from upstream to downstream, along the axial direction of the transition piece, the opening ratio σp of each of the plurality of vent holes decreases, and wherein the opening ratio σp of each of the plurality of vent holes is adjusted by varying diameters of the vent holes alone the axial direction of the transition piece.

2. The gas turbine according to claim 1, wherein a sound tube used for adjusting acoustic absorption characteristics of a specific frequency band is disposed to the first member.

* * * * *